United States Patent Office 3,317,606
Patented May 2, 1967

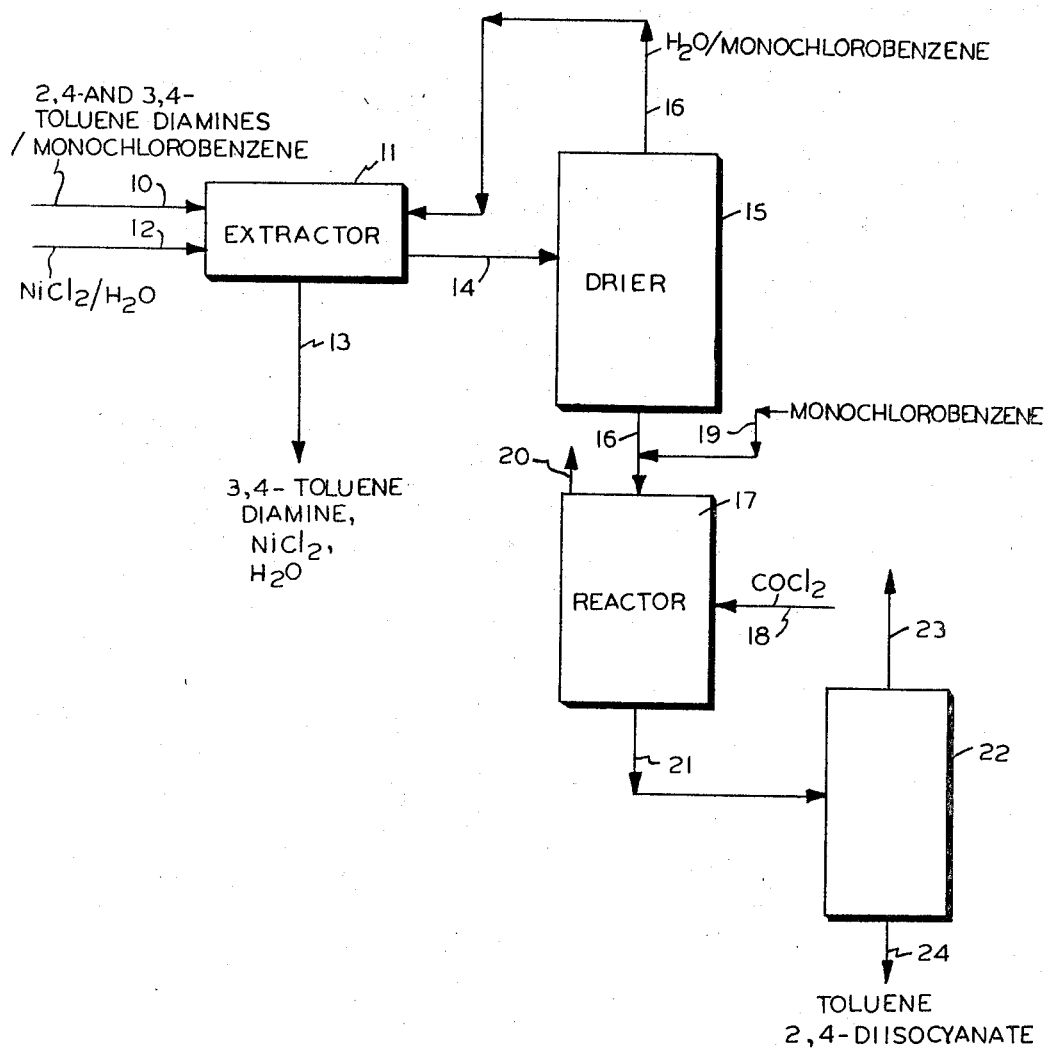

3,317,606
PROCESS FOR SEPARATING VICINAL AND NON-VICINAL TOLUENE DIAMINES
Benjamin J. Luberoff, Monsey, N.Y., and Daniel H. Gold, Plainfield, N.J., assignors to The Lummus Company, New York, N.Y., a corporation of Delaware
Filed May 21, 1963, Ser. No. 281,933
7 Claims. (Cl. 260—582)

The present invention is directed to a process for preparing non-vicinal diisocyanates. More specifically, the present invention relates to a process whereby the diisocyanates of desired purity are prepared from corresponding non-vicinal toluene diamines contaminated with vicinal toluene diamines.

As is well known in the art, urethane polymers are preferentially prepared from non-vicinal toluene diisocyanates and the latter, in turn, are formed by reacting phosgene with the corresponding non-vicinal toluene diamines. However, the toluene diamines so used are generally available commercially as a mixture together with vicinal toluene diamines which lead to undesirable products and which reduce the yield of non-vicinal diisocyanates. Thus, when the amino groups of a toluene diamine are in vicinal juxtaposition, cyclic ureas are formed instead of the desired diisocyanate. This is shown by the following reaction (I), which occurs preferentially rather than the intended reaction (II):

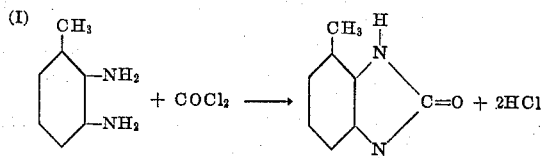

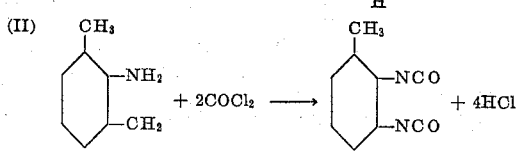

When the diamines are non-vicinal, reaction III occurs preferentially:

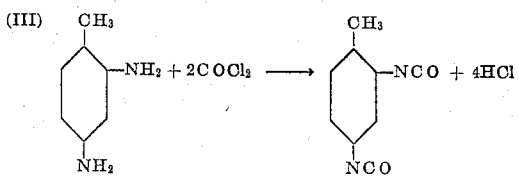

Thus, if a non-vicinal diamine charge is contaminated with isomeric vicinal diamines, phosgene is consumed by reaction with the contaminants and an impure product results. Furthermore, the unwanted cyclic ureas form intractable sludges by combining with the desired diisocyanates, thereby resulting in physical removal problems, as well as loss in yield. As is well known, the subject diamines are produced by reducing the corresponding dinitro toluenes so that the isomer distribution is fixed by the nitration conditions. In general, where non-vicinal material is desired, nitration can be adjusted so that as little as 3–10% of vicinal nitration occurs. Commercial toluene diamine mixtures for diisocyanate manufacture generally contain 5–7% vicinal material, with the majority of the non-vicinal diamine being the 2,4 isomer. When a mixture of the foregoing character is phosgenated in the usual manner, sludges form and yield of desired product is less than 95%.

It is an object of the present invention, therefore, to provide a process for preparing non-vicinal toluene diisocyanates, in high yield and substantially free of undesirable materials, from a mixture of corresponding non-vicinal and vicinal toluene diamines. Other objects will be apparent from the following description.

The process of the present invention comprises:
(a) forming a solution of a mixture containing a non-vicinal and a vicinal toluene diamine and a solvent (A) for the diamines;
(b) forming a solution of a metal compound of a metal having an atomic number selected from 22–30, 40–48 and 72–80, and a solvent (B) for said compound, the solution containing an amount of said compound ranging from about that sufficient to provide a concentration from 10 percent of saturation to that just short of saturation, solvents (A) and (B) being substantially immiscible with each other;
(c) contacting the solutions of (a) and (b), whereupon a liquid phase of said solvent (A) containing said non-vicinal toluene diamine in greater relative concentration than in said mixture and a liquid phase of said solvent (B) containing said vicinal toluene diamine in greater relative concentration than in said mixture, are formed;
(d) separating said liquid phases formed in (c); and
(e) reacting said non-vicinal toluene diamine in said solvent (A), with phosgene, whereupon a non-vicinal toluene diisocyanate is formed.

Metal compounds useful herein are in the form of a soluble salt such as a halide, nitrate, sulfate, carboxylate, complex hydroxide and oxide, etc. They can also be provided in the form of an aquo or ammino complex of one or more of the metals. Metals of such compound are those having atomic numbers selected from 22 through 30, 40 through 48 and 72 through 80. Preferred metals are cobalt, nickel and copper.

By way of illustration, metal compounds suitable for use include: nickel chloride; cupric halides, nitrate, sulfate, acetate, hexammine chloride; cadmium sulfate; zinc halides; cobalt halides; and chloropentammino cobaltic chloride. Particularly advantageous results are realized with nickel chloride, and for this reason it is preferred.

Solvents, identified herein as (A), are solvents for toluene diamines and include hydrocarbons such as toluene, xylene, benzene, tetrahydronaphthalene, cyclohexane, kerosene, cymene, diphenyl, and a variety of other aromatic and cycloaliphatic hydrocarbons in which they dissolve. The polyamines can also be used with solvents having an oxygen atom therein, typical of which are higher alcohols ($C_6$ and higher) and dibutyl ether. Preferred, however, are the chlorinated hydrocarbons represented by chlorobenzene, polychlorobenzenes, chlorotoluenes, carbon tetrachloride, tetrachlorethylene, trichlorethylene, etc., and, of such chlorinated materials, monochlorobenzene is preferred.

The metal compounds used herein are in solution in a solvent (B) when brought into contact with a mixture of toluene diamines. Solvent (B) can be water, an alcohol such as methanol and ethanol, a polyol such as glycerol, etc.

In selecting a solvent for the toluene diamines and another for the metal compound, it is advantageous that the solvents—(A) and (B)—be substantially immiscible one with the other. If either of the solvents reacts with phosgene, then it must be separated from the non-vicinal diamine prior to treating the diamine with phosgene. For example, when (B) is a polyol, the small amount which has dissolved in (A) can be washed out with water and the resulting diamine solution dried.

Temperatures at which the materials are contacted should be below the boiling temperature of the solvents used. Temperatures between 20° C. and 90° C. are preferred. The quantity of metal compound used will vary considerably, depending upon the efficiency of the metal compound, the concentration of vicinal toluene diamine or diamines present in the mixture, degree of purification desired, temperature, solvents selected, etc. In general, at least about 0.2 and preferably from about 0.3 to about 1 molar proportion of metal compound will be used for each molar proportion of vicinal toluene diamine desired to be removed from the mixture to be treated.

The present invention is more fully described and exemplified in the following discussion with reference to the figure made a part of this application. In the figure, a preferred flow sheet is shown for preparing toluene 2,4-diisocyanate from a mixture of 2,4- and 3,4-toluene diamines. The mixture of diamines in monochlorobenzene in line 10 is introduced into extractor 11 wherein it is contacted with an aqueous solution of nickel chloride, introduced via line 12. For example, the chlorobenzene solution in line 10 contains 9 percent by weight of toluene diamines comprising 5.5 percent of the 3,4 isomer and the balance the 2,4 isomer. The aqueous solution in line 12 contains about 1.5 percent of nickel ion. Ten volumes of the solution in line 10 are so contacted with one volume of the aqueous solution in line 12. The use of an essentially saturated solution in a related process is described in companion application Ser. No. 281,905, filed concurrently herewith May 21, 1963.

The materials introduced into extractor 11 are agitated by agitating means (not shown) until equilibrium is essentially established. Time is not critical, but equilibration generally takes from 15 minutes to an hour at a temperature of about 65° C. Two liquid phases are formed. The aqueous phase in extractor 11 comprises toluene 3,4-diamine and nickel chloride, and is removed through line 13. The aqueous phase removed through line 13 also contains some 2,4-toluene diamine, but substantially less than that present in the original mixture charged in line 10. It will be understood that, although not illustrated in the figure, toluene 3,4-diamine can be recovered from the material in line 13. For example, aqueous sodium hydroxide can be added to said material whereupon nickel oxide is formed as a precipitate, and an aqueous mixture of toluene 3,4-diamine is formed. The diamine can be dried and recovered. So, too, nickel oxide can be converted to the chloride in order that the nickel be recovered for further use in the process.

The other layer in extractor 11 comprises a wet solution of monochlorobenzene containing toluene 2,4-diamine in greater relative concentration than in the mixture of diamines charged in line 10. This layer is withdrawn through line 14 to drying unit 15. Water can be driven off via overhead line 16 via heating. A second miscible solvent can be added at this or a later point to help carry off water and/or to later dissipate heat during phosgenation. Generally, the water will carry with it a small amount of monochlorobenzene or co-solvent. If desired, the overhead product can be returned to extractor 11. It will be understood that any suitable drying unit such as one packed with desiccant can be used. Substantially dry toluene 2,4-diamine in monochlorobenzene is taken from drier 15 through line 16 to reactor 17 wherein reaction is effected with phosgene ($COCl_2$) which is introduced via line 18. With multistage operation (4 to 5 stages), the diamine in line 16 has a purity of more than 99.5 percent in contrast to 95 percent in the original charge in line 10.

In reactor 17, the monochlorobenzene solution containing 2,4-toluene diamine is regulated such that it contains about 10 percent by weight of the diamine. Additional monochlorobenzene is added to the solution in line 16, if necessary, via line 19. Phosgene is added through line 18 while the temperature of the materials in reactor 17 is maintained between about 20° C. and about 80° C. Approximately one molar proportion of phosgene per molar proportion of diamine is so added. Then, additional phosgene is added while the temperature is increased to reflux. Phosgene is added until no further reaction occurs with diamine. Hydrogen chloride formed in reactor 17 is removed via vent 20. The resulting reaction mixture is removed from reactor 17 through line 21 to distillation tower 22. Monochlorobenzene is removed from tower 22 through overhead line 23 and the desired diisocyanate is removed through line 24. The diisocyanate in line 24 is substantially free of cyclic ureas and unwanted products.

It will be recognized that the foregoing illustration in the figure is diagrammatic, and that pumps, heaters, coolers, heat exchangers, pressure vessels of various character can be employed.

While the invention has been described in detail according to preferred processes, mixtures of polyamines and metal compounds for carrying out the processes, it is to be understood that changes and modifications can be made without departing from the spirit or scope of the invention and it is intended in the appended claims to cover such changes and modifications.

We claim:
1. A process for separating a non-vicinal toluene diamine from a diamine solution containing a mixture of vicinal and non-vicinal toluene diamines comprising:
  a. extracting the vicinal toluene diamine from the diamine solution with an unsaturated solution of a metallic compound, said solution containing a concentration of metallic compound that is at least 10 percent of the saturation concentration, said diamine solution and said solution containing a metallic compound being substantially immiscible with each other, said metal being selected from the group consisting of metals having atomic number 22 through 30 and 40 through 48.
  b. separating the metallic compound solution containing extracted vicinal toluene diamine from the diamine solution, and
  c. recovering non-vicinal toluene diamine from the diamine solution.

2. The process of claim 1 wherein the solvent for the diamine solution is selected from the group consisting of hydrocarbon, chlorinated hydrocarbon, hydrocarbon alcohol having at least six carbon atoms and hydrocarbon ether solvents, and the solvent for the metallic compound is selected from the group consisting of water, alcohols and polyols.

3. The process of claim 1 wherein the mixture comprises 2,4- and 3,4-toluene diamines.

4. The process of claim 1 wherein the mixture comprises a major proportion of 2,4- and 2,6-toluene diamines and a minor proportion of 2,3- and 3,4-toluene diamines.

5. The process of claim 1 wherein the solution containing a metallic compound is an aqueous solution of nickel chloride containing from about 10 to about 90 percent of that nickel chloride sufficient to form a saturated solution.

6. The process of claim 1 wherein the metal compound is nickel chloride.

7. The process of claim 6 wherein the solvent for the diamine solution is monochlorobenzene and the solvent for the nickel chloride solution is water.

References Cited by the Examiner

UNITED STATES PATENTS

| | | | |
|---|---|---|---|
| 2,795,597 | 6/1957 | Smutz | 260—453 |
| 2,831,012 | 1/1958 | Bernard | 260—453 |
| 2,946,821 | 7/1960 | Schenck et al. | 260—582 |
| 2,946,822 | 7/1960 | Schenck et al. | 260—582 |
| 3,076,005 | 1/1963 | d'Ostrowick et al. | 260—439 |

FOREIGN PATENTS

| | | |
|---|---|---|
| 328,418 | 5/1930 | Great Britain. |
| 795,639 | 5/1958 | Great Britain. |

CHARLES B. PARKER, *Primary Examiner.*

DALE R. MAHANAND, *Assistant Examiner.*